United States Patent

Fischer et al.

[11] Patent Number: 5,989,350
[45] Date of Patent: Nov. 23, 1999

[54] MODIFIED STARCH

[75] Inventors: Monica Fischer, Savigny; Pierre Wursch, La Tour-de-Peilz, both of Switzerland; Eric Plante, Port Sainte Marie, France

[73] Assignee: Nestec S.A., Vevey, Switzerland

[21] Appl. No.: 09/123,252

[22] Filed: Jul. 27, 1998

[30] Foreign Application Priority Data

Jul. 28, 1997 [EP] European Pat. Off. .............. 97202363

[51] Int. Cl.$^6$ ...................................................... C08L 3/02
[52] U.S. Cl. ........................... 127/33; 127/71; 106/215.3; 426/654; 426/661; 536/102
[58] Field of Search ..................... 106/215.3; 127/33, 127/71; 426/654, 661; 536/102

[56] References Cited

U.S. PATENT DOCUMENTS

| | | | |
|---|---|---|---|
| 4,491,483 | 1/1985 | Dudacek et al. | 127/33 |
| 4,508,576 | 4/1985 | Muddle | 106/213 |
| 5,100,475 | 3/1992 | Wursch et al. | 127/67 |

FOREIGN PATENT DOCUMENTS

| | | |
|---|---|---|
| 0 076 381 | 8/1982 | European Pat. Off. . |
| 0 150 715 | 1/1985 | European Pat. Off. . |
| 0 710 670 | 11/1994 | European Pat. Off. . |

*Primary Examiner*—David Brunsman
*Attorney, Agent, or Firm*—Pennie & Edmonds LLP

[57] ABSTRACT

Heat-modified starch having a Brabender viscosity in aqueous dispersion at 6% by weight of between 750–900 B.U, after 5 min at 95° C. The starch is heat treated with a monoglyceride.

10 Claims, 1 Drawing Sheet

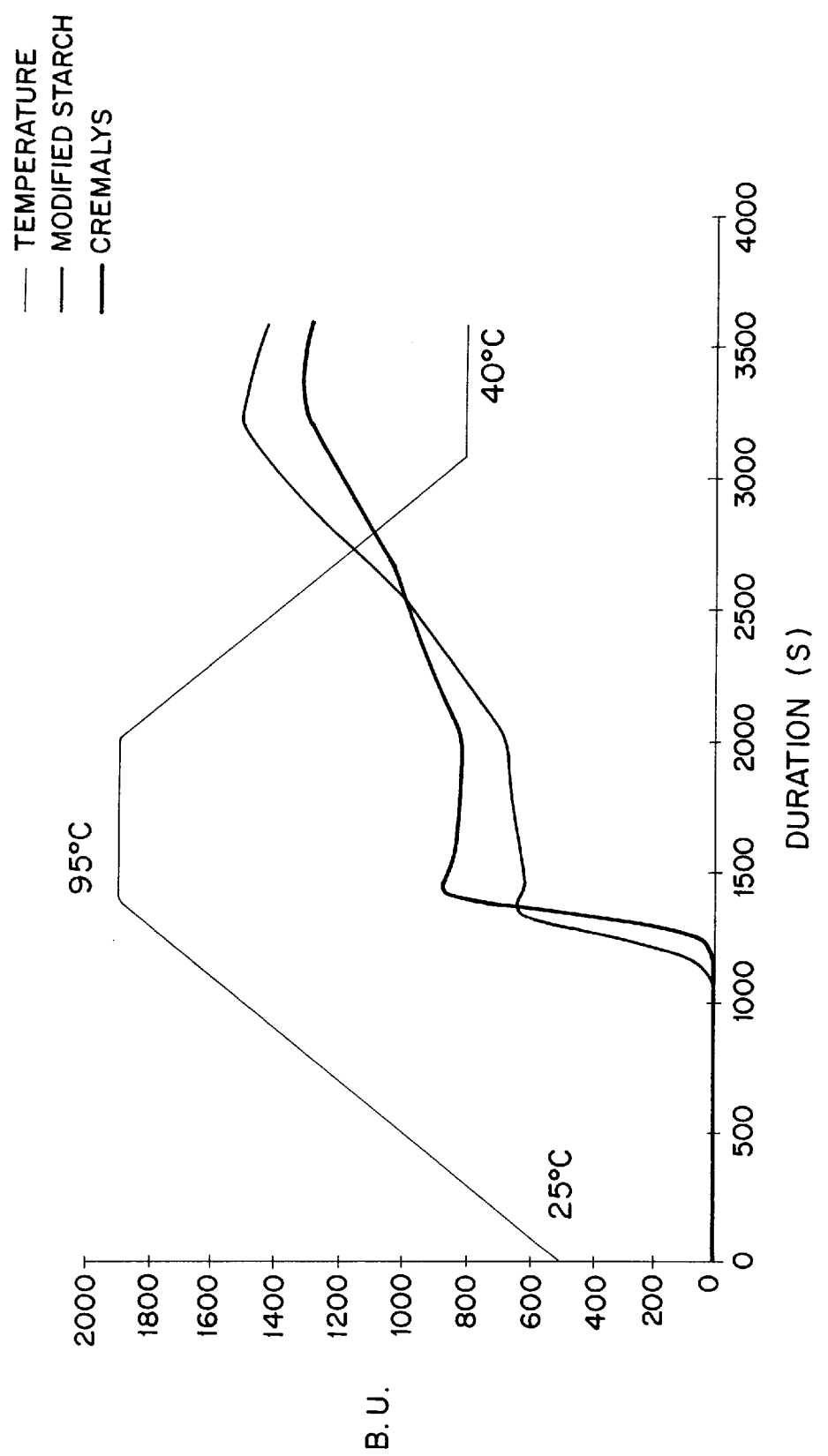

MODIFIED STARCH

BACKGROUND ART

The subject of the present invention is a heat-modified starch.

Starch is the principal carbohydrate component of higher plants. It includes 98–99%, of a carbohydrate fraction which is a mixture of amylose and amylopectin. At room temperature, native starch granules are insoluble in water. This insolubility is attributed to the crystalline organization of starch. Starch is only of low industrial interest in this case. By hydrothermal treatment, or by gelatinization, this crystalline organization is destroyed and starch finds numerous industrial applications.

In the food sector, native or modified starches are used as texturing agents, as thickeners, as gelling agents or as stabilizers. However, certain food technologies require starches having specific properties, such as shear strength, viscometric stability, preservation of viscosity in acid medium, delayed gelatinization or satisfactory heat transfer during sterilization.

Moreover, in the face of the innovations in the food technology sector, it is necessary to have available thickeners having not only predictable behavior, but also controllable behavior.

A varied choice of modified starches exists depending on the raw material, the treatment carried out and its intensity.

Thus, EP 0,710,670 describes a process for the preparation of a chemically modified starch as well as the apparatus which makes it possible to chemically modify this starch. In the process, a starch, having a water content of 9–25%, is chemically treated in a turbo-reactor, at 300–1500 rpm and at acidic pH, in the presence of a modifying agent, such as, for example, an alkylating agent or an acylating agent.

However, in the food sector, the use of chemically modified starches is regulated and should appear on the product packaging. Physical modifications make it possible to avoid these constraints.

Accordingly, U.S. Pat. No. 4,508,576 describes a process for the preparation of a maize starch which is dispersible in boiling water at 5% and which has a high viscosity level of 2000 centipoises at 70° C. In this process, a mixture having a water content of 43–50% and containing maize starch granules and an emulsifier, such as glycerol monostearate, sorbitol and propylene oxide, is microwave-heated at 50–85° C. for 1 h so as to reduce the water content to 15%.

Moreover, EP 0,150,715 describes a process for the preparation of a starch which is dispersible in boiling water at 95–100%. In this process, a mixture having a water content of 20–30% by weight and containing starch, 1–5% of emulsifiers, relative to the dry weight of the starch, and water, is heat-treated with microwaves at 90–120° C. for 1–20 min.

Finally, Société Roquette Frères S. A., 4 rue Patou, F-59022 LILLE, markets a starch, under the name of Cremalys, having a gelatinization temperature of 83° C., but not having sufficient viscostability, that is to say that the increase in the viscosity of this starch on cooling is high.

SUMMARY OF THE INVENTION

The aim of the present invention is to provide a heat-modified starch which rapidly develops a high viscosity during the heat modification which it undergoes, as well as a process which makes it possible to prepare this starch simply and rapidly.

To this effect, the heat-modified starch according to the invention has a Brabender viscosity in aqueous dispersion at 6% by weight of between about 750–900 B.U, after 5 min at 95° C.

It has been observed, surprisingly, that the heat-modified starch according to the present invention has the advantage of rapidly developing a high viscosity during the heat modification which it undergoes. Because of its high gelatinization temperature, the heat-modified starch according to the present invention has the advantage of finding application in the preparation of numerous food compositions, including, in particular, pasteurized fresh products. Thus, the heat-modified starch according to the present invention has the advantage of not gelatinizing at the pasteurization temperatures and of developing its viscosity only during cooking of the product. Furthermore, the heat-modified starch according to the present invention has the advantage of being viscostable, that is to say that it is not necessary to expect a great difference between the texture obtained during preparation of a food product and its consumption.

BRIEF DESCRIPTION OF THE DRAWING

FIG. 1 is an amylogram which illustrates the variation in viscosity of certain starches during heat treatments thereof.

DETAILED DESCRIPTION OF THE PREFERRED EMBODIMENTS

In the remainder of the description, the name B.U will be used to designate the value of the Brabender viscosity expressed in Brabender Units, which is defined from a viscoamylograph. The principle of the viscoamylograph consists in measuring the variation in the viscosity of a starch suspension prepared with water at 6% sample dry matter content, during the period of heating, from 25 to 95° C., during the holding period, 10 min at 95° C., and during the cooling period, from 95 to 40° C. The heating and cooling are carried out at the rate of 3° C./min. The viscosity is measured as a force exerted on the measuring needle (cm/g) by the suspension maintained under shearing. The values are then converted to Brabender units (B.U).

In the remainder of the description, the Brabender viscosity corresponds to the measurement of the viscosity 5 min after the period of heating at 95° C.

Furthermore, in the remainder of the description, the viscostability corresponds to the increase in the viscosity during cooling. The viscostability, expressed as a percentage, corresponds to the ratio of the difference in viscosity measured at 40° C. and at 95° C. to the viscosity measured at 95° C. A variation of ±10% of the viscosity over the temperature range of 40 to 95° C. is considered to be a viscostable material.

Moreover, in the remainder of the description, the gelatinization temperature corresponds to the measurement of the viscosity at 20 B.U.

Finally, in the remainder of the description, the dispersibility, expressed as a percentage, corresponds to the ratio of the quantity of nondispersed starch per 100 g of water to the total quantity of dispersed starch.

The heat-modified starch according to the present invention may be viscostable during cooling between 95–40° C., for example. It can rapidly develop a high viscosity, exhibiting very few changes, during cooling, for example.

The heat-modified starch according to the present invention can have a Brabender viscosity of about 1220 B.U maximum at the end of cooling, for example.

In the process for the preparation of a heat-modified starch according to the present invention, a mixture comprising a native starch about, 0.2–1% by weight of a monoglyceride, relative to the dry weight of the starch, and water, is prepared so as to have a mixture having a water content of about 30–36%, then this mixture is heat-treated in a turbo-reactor, at about 95–130° C., at a rotating speed of about 400–525 revolutions/min, so as to obtain a heat-modified starch.

A mixture comprising a native starch, 0.2–1% by weight of a monoglyceride, relative to the dry weight of the starch, and water, is therefore prepared so as to have a mixture having a water content of 30–36%.

It is possible to use, as native starch, a native potato starch, in particular that marketed by Sugro A.G, Sevogel Str. 21, CH-4002 BASEL.

It is possible to use, as monoglyceride, Mono Di HS40, Dimodan PV or Dimodan SDM-T, which are emulsifiers marketed by Danisco Ingredients, Loretohahe 16, CH-6001 ZUG, so as to allow better dispersibility of the mixture during the heat treatment. Preferably, 0.2–1% by weight of monoglyceride, relative to the dry weight of the starch, is used so as to obtain a heat-modified starch having very good sensory qualities and, more particularly, a smooth texture. Indeed, if the mixture is prepared with a monoglyceride content greater than 1% by weight, relative to the dry weight of the starch, a heat-modified starch having a rough texture is obtained.

Preferably, a mixture having a water content of 30–36% is prepared so as to avoid excessive pregelatinization and localized gelatinizations causing agglomeration of the native starch granules.

This mixture is therefore then heat-treated in a turbo-reactor, at 95–130° C. and at a rotating speed of 400–535 revolutions/min, so as to obtain a heat-modified starch.

The turbo-reactor may be in particular a horizontal jacketed cylinder so as. to allow heating of the product by conduction and having an inlet for products and inlets for injection of hot air, for example. The turbo-reactor is provided with paddles on its central axle so as to allow good dispersion of the product as soon as it enters the turbo-reactor.

The mixture can be heat-treated at 95–130° C. and at a rotating speed of 400–535 rpm, so as to obtain a satisfactory gelatinization temperature for the mixture.

The heat-modified starch can then be dried so that it has a water content of less than 15%. It can be dried under a stream of hot air, for example.

By the process according to the present invention, a heat-modified starch is obtained, after cooling, in the form of fine particles.

Finally, the present invention also relates to the use of a heat-modified starch according to the present invention for the preparation of a food composition. This heat-modified starch can be used in particular for the preparation of sauces, soups or other dishes.

EXAMPLES

The heat-modified starch and the process of preparation according to the present invention are described in greater detail with the aid of the nonlimiting examples below. In these examples, the gelatinization temperature, the viscostability and the Brabender viscosity after 5 min at 95° C. are defined and determined as indicated above in the present disclosure. The percentages are given by weight, unless otherwise indicated.

Example 1

A premixture is prepared in a Lodige-type mixer marketed by Société Lödige Gebrüder MaschinenBau GmbH, Elsenerstrasse 79, DE-33102 PADERBORN. To do this, native potato starch, marketed by Sugro A.G, Sevogel Str. 21, CH-4002 BASEL, is first mixed with a monoglyceride, the emulsifier Dimodan SDM-T, marketed by Danisco Ingredients, Loretohbhe 16, CH-6001 ZUG. Water is then slowly added continuously so as to obtain a homogeneous mixture. The quantities of starch, monoglyceride and water are calculated so that the mixture thus prepared has a water content of 32% and contains 0.35% of monoglyceride relative to the dry weight of the starch.

The mixture is introduced into a turbo-reactor.

This mixture is then heat-treated in the turbo-reactor at 100° C. and at a rotating speed of 500 rpm, so as to produce a heat-modified starch.

The heat-modified mixture is then dried in a stream of hot air so as to obtain a heat-modified starch in the form of fine particles having a water content of 10%.

The heat-modified starch thus prepared has a dispersibility of 100%. In an aqueous dispersion at 6%, it has a gelatinization temperature of 90.5° C. and a Brabender viscosity after 5 min at 95° C. of 890 B.U.

Examples 2–4

3 mixtures, having a water content of 32% and containing 0.2%–1% of monoglyceride, relative to the dry weight of the starch, are prepared, heat-treated and then dried in the manner described in Example 1.

The monoglyceride content of these 3 mixtures as well as the gelatinization temperature and the viscostability of the 3 heat-modified starches thus prepared are stated in Table I below:

TABLE I

| Example (No.) | Monoglyceride content (%) | Gelatinization temperature (° C.) | Viscostability (%) |
|---|---|---|---|
| 2 | 0.25 | 86 | 60 |
| 3 | 0.4 | 90.5 | 57 |
| 4 | 1 | 89 | 57 |

The results mentioned in Table I demonstrate the fact that the heat-modified starch according to the present invention has a high gelatinization temperature and a very advantageous viscostability. Indeed, measurement of the viscostability of these 3 mixtures, having a water content of 32% and containing 0.2%–1% of monoglyceride, relative to the dry weight of the starch, demonstrates the fact that during the treatment, the mixture according to the present invention undergoes very little change in viscosity.

Comparative Example 1i

The influence of the quantity of monoglyceride used for the preparation of the mixture is checked.

To do this, a mixture having a water content of 32% and containing 2% of monoglyceride, relative to the dry weight of the starch, is prepared, heat-treated and then dried in the manner described in Example 1.

The monoglyceride content of this mixture as well as the gelatinization temperature and the viscostability of the heat-modified starch thus prepared are stated in Table II below:

TABLE II

| Example (No.) | Monoglyceride content (%) | Gelatinization temperature (° C.) | Viscostability (%) |
| --- | --- | --- | --- |
| 1i | 2 | 82 | 97 |

If a mixture having a water content of 32% and containing a quantity of monoglyceride greater than 1% is prepared, heat-treated and dried according to the present invention, a heat-modified starch is obtained which does not have a very good gelatinization temperature and which has a disadvantageous viscostability value. Indeed, the viscqstability value as stated in Table II demonstrates that the mixture containing a quantity of 2% of monoglyceride undergoes substantial viscosity modifications during heat treatment.

Comparative Example 2i

The variation in the viscosity of a starch suspension prepared from a sample of heat-modified starch obtained using the process according to the present invention is measured with the aid of a viscoamylograph. This viscosity is then compared with that of a suspension prepared from a starch sample marketed under the name CREMALYS, by Société Roquette Frères, 4 rue Patou, F-59022 LILLE.

Each of these two suspensions (500 ml) is prepared with water at 6% sample dry matter content.

The variation in the viscosity of these two suspensions, during the heating period, from 25 to 95° C., during the holding period, 10 min at 95° C. and during the cooling period, from 95 to 40° C., is measured. The heating and cooling are carried out at the rate of 3° C./min.

The measurements of the variation of these two samples are represented on the amylogram, in FIG. 1, below.

The amylogram, in FIG. 1, demonstrates the fact that the starch, marketed under the name CREMALYS, undergoes greater variations in viscosity during the heat treatment than the heat-modified starch according to the present invention.

Example 6

A white sauce containing the heat-modified starch obtained using the process according to the present invention is prepared.

To do this, a dehydrated mixture containing 13% of flour, 15% of heat-modified starch according to the present invention, 14% of sunflower oil and 55% of aromatic premix which contains skimmed milk powder is prepared. A sufficient amount of this dehydrated mixture is poured in boiling water, in order to obtain a white sauce having a very unctuous texture.

Example 7

A sauce with oriental flavor containing heat-modified starch obtained using the process according to the present invention is prepared.

To do this, a dehydrated mixture containing 20.3% of heat-modified starch according to the present invention, 13.6% of high-viscosity wheat flour, 33.9% of tomato puree, 10.2% of extract of meat in paste form and 22% of spices is prepared at room temperature. A sufficient amount of this dehydrated mixture is mixed in boiling water, in order to obtain a sauce with oriental flavor having a smooth and unctuous texture.

What is claimed is:

1. A heat-modified starch having a Brabender viscosity of about 705–900 B.U. measured in an aqueous dispersion of 6% by weight of the starch in water after 5 minutes at 95° C.

2. The starch of claim 1 having a maximum Brabender viscosity of about 1220 B.U. measured when the dispersion is cooled to 40° C.

3. A composition comprising a food product that contains therein the heat-modified starch of claim 2.

4. The starch of claim 1 wherein the viscosity value does not change by more than 10% over the temperature range of 40 to 95° C.

5. A composition comprising a food product that contains therein the heat-modified starch of claim 4.

6. The starch of claim 1 having a water content of less than 15%.

7. A composition comprising a food product that contains therein the heat-modified starch of claim 1.

8. A process for the preparation of a heat-modified starch which comprises preparing a mixture of a starch, a monoglyceride in an amount of about 0.2 to 1% based on the dry weight of the starch, and water in an amount to provide the mixture with a water content of about 30 to 36%; and heat-treating the mixture at a temperature of about 95 to 130° C. while rotating the mixture at a speed of about 400 to 535 revolutions per minute, to obtain a heat-modified starch having a heat-modified starch having a Brabender viscosity of about 705–900 B.U. measured in an aqueous dispersion of 6% by weight of the starch in water after 5 minutes at 95° C.

9. The process of claim 8 wherein the starch is a potato starch and the mixture is heat-treated with hot air in a turbo-reactor which includes a rotating puddle mixer.

10. The process of claim 8 which further comprises drying the heat-modified starch to a water content of less than 15%.

* * * * *